Oct. 15, 1935.  F. C. SANDSTROM  2,017,734

CREAM SEPARATOR BOWL

Filed Jan. 24, 1933  3 Sheets-Sheet 1

Inventor
Felix C. Sandstrom

Oct. 15, 1935.    F. C. SANDSTROM    2,017,734
CREAM SEPARATOR BOWL
Filed Jan. 24, 1933    3 Sheets-Sheet 2

Inventor
Felix C. Sandstrom
By [signature]
Atty

Oct. 15, 1935.  F. C. SANDSTROM  2,017,734
CREAM SEPARATOR BOWL
Filed Jan. 24, 1933  3 Sheets-Sheet 3
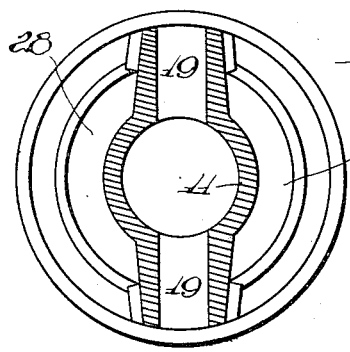
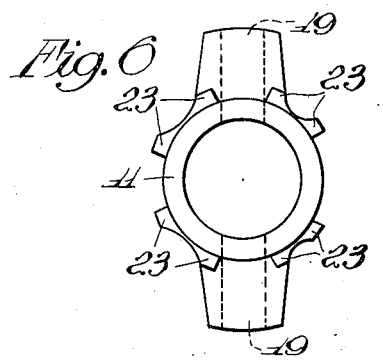
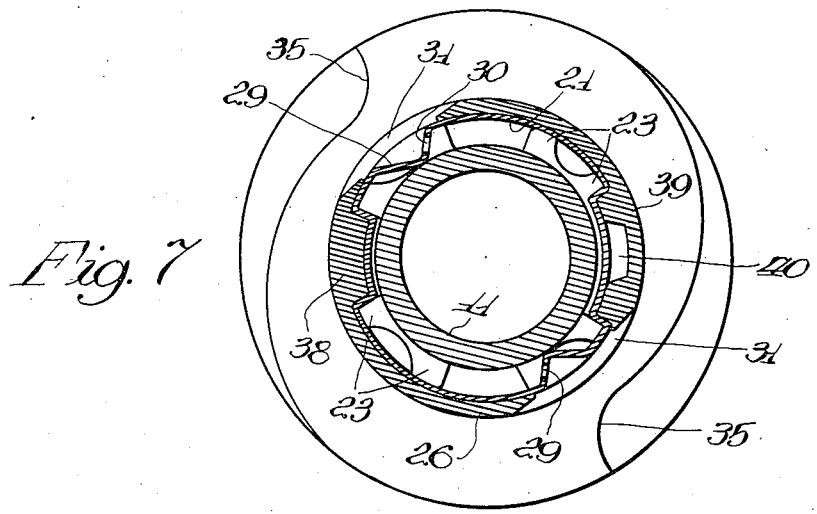
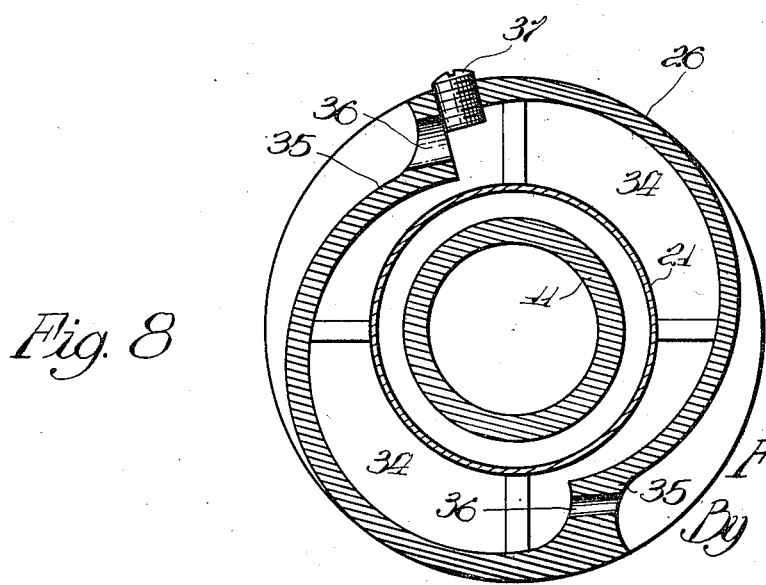

Patented Oct. 15, 1935

2,017,734

UNITED STATES PATENT OFFICE 2,017,734

CREAM SEPARATOR BOWL

Felix C. Sandstrom, Milwaukee, Wis., assignor to International Harvester Company, a corporation of New Jersey Application January 24, 1933, Serial No. 653,299

2 Claims. (Cl. 233—29)

The invention is in the field of centrifugal cream separators and relates particularly to improvements in the separator bowl employed in such machines.

The main objects of the invention are to provide an improved circulation of the whole milk into the bowl and through the bowl disks; and improved division of the cream and skim milk; an improved cream and skim milk outlet; all of these improvements cooperating to set up balanced forces within the bowl during its rotation to prevent a gyral or tipping action of the bowl on its spindle, thus insuring smoother turning of the bowl resulting in an even cream and skim milk outflow from the bowl, which, of course, is highly desirable.

Another object is to provide an improved lower disk construction that will enable lowering of the height of the assembled stack of separator disks and consequently the bowl, or, looking at it in another way, permit the use of a greater number of disks for the same given height.

Still another object is in the provision of an improved fool proof mounting for the dividing disk and the upper bowl shell on the upper end of the bowl shaft.

Generally, it is also an object to provide a symmetrical design and arrangement of parts to improve the balance and smooth running of the bowl.

Other important objects will become apparent to those skilled in this art as the disclosure is more fully made.

Briefly, these desirable objects may be achieved by the practicable example of the bowl selected for illustration in the accompanying sheets of drawings in which the bowl is formed with the same number of whole milk inlets, the same number of cream outlets, the same number of skim milk outlets,—all inlets and outlets of the same kind being arranged diametrically opposed to create a twisting moment with opposite balanced action and reaction of the forces to create a couple that aids even rotation of the bowl by preventing a tipping or gyral action. By cutting off the peripheral flange of the bottom disk, the height of the stack of separator disks may be lowered, or a greater number of disks may be employed for the same given height. The tubular bowl shaft is formed with a collar presenting an irregular formation, to which the neck of the separator disk conforms, so that the separator disk can be assembled only one way on said tubular shaft. This construction also serves as a fool proof locater for the upper bowl shell.

In the sheets of drawings:

Figure 5 is a cross sectional view through the tubular bowl shaft, as seen along the line 5—5 appearing in Figure 3;

Figure 6 is a top plan view of the tubular bowl shaft;

Figure 7 is a cross sectional view through the bowl assembly, as seen along the line 7—7 appearing in Figure 3; and, Figure 8 is another cross sectional view through the bowl assembly, as seen along the line 8—8 appearing in Figure 3.

Figure 1:
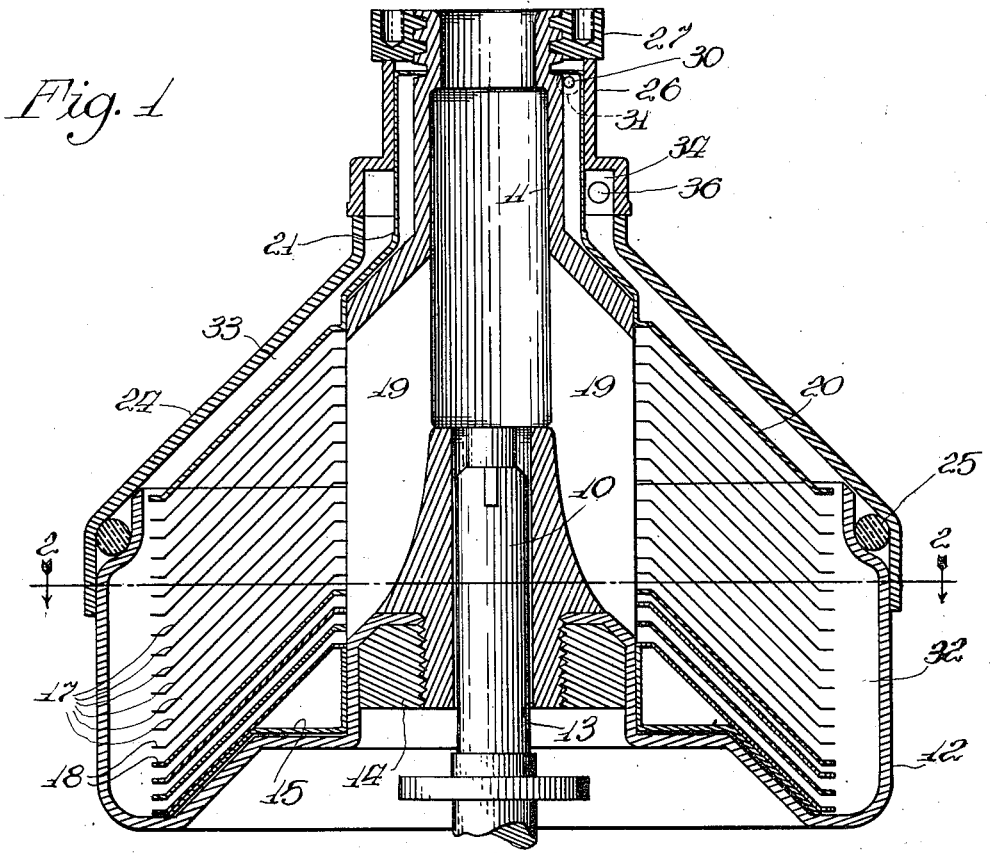
Figure 1 is a cross sectional view through the improved bowl, as seen along the line 1—1 appearing in Figure 2.
Figure 2:
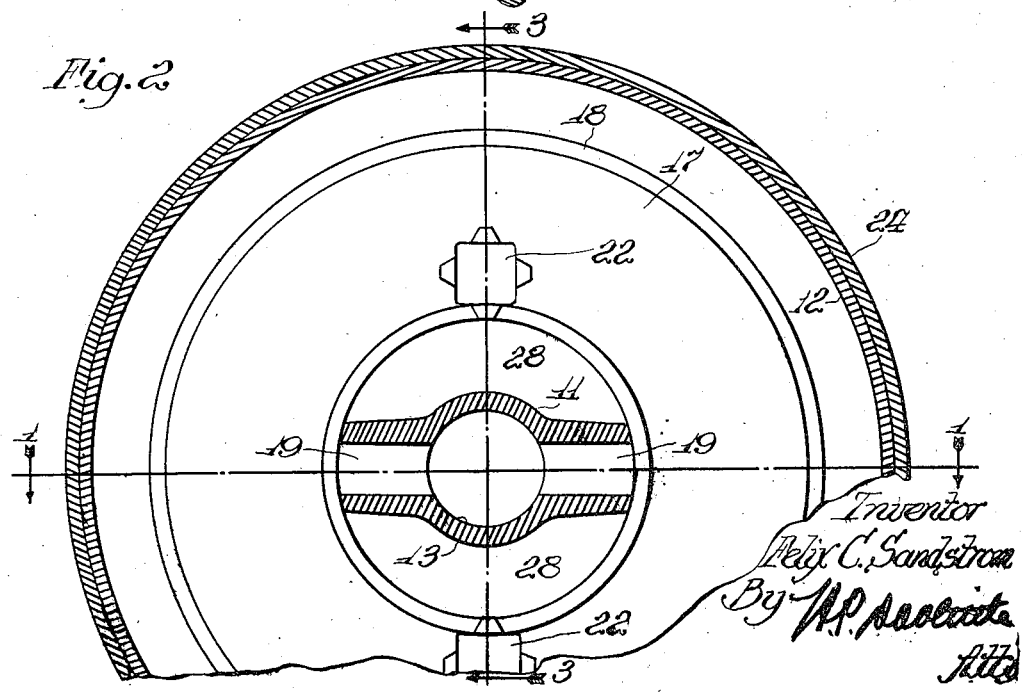
Figure 2 is a cross sectional view through the bowl, as seen along the line 2—2 appearing in Figure 1.

As shown in Figures 1 and 2, the vertical drive spindle of the cream separator is shown at 10, the tubular shaft 11 of the separator bowl 12 being formed with a bore 13 to fit over the top of the spindle 10, said bowl 12 being secured to the lower end of the tubular shaft 11 by means of a nut 14.

Figure 3:
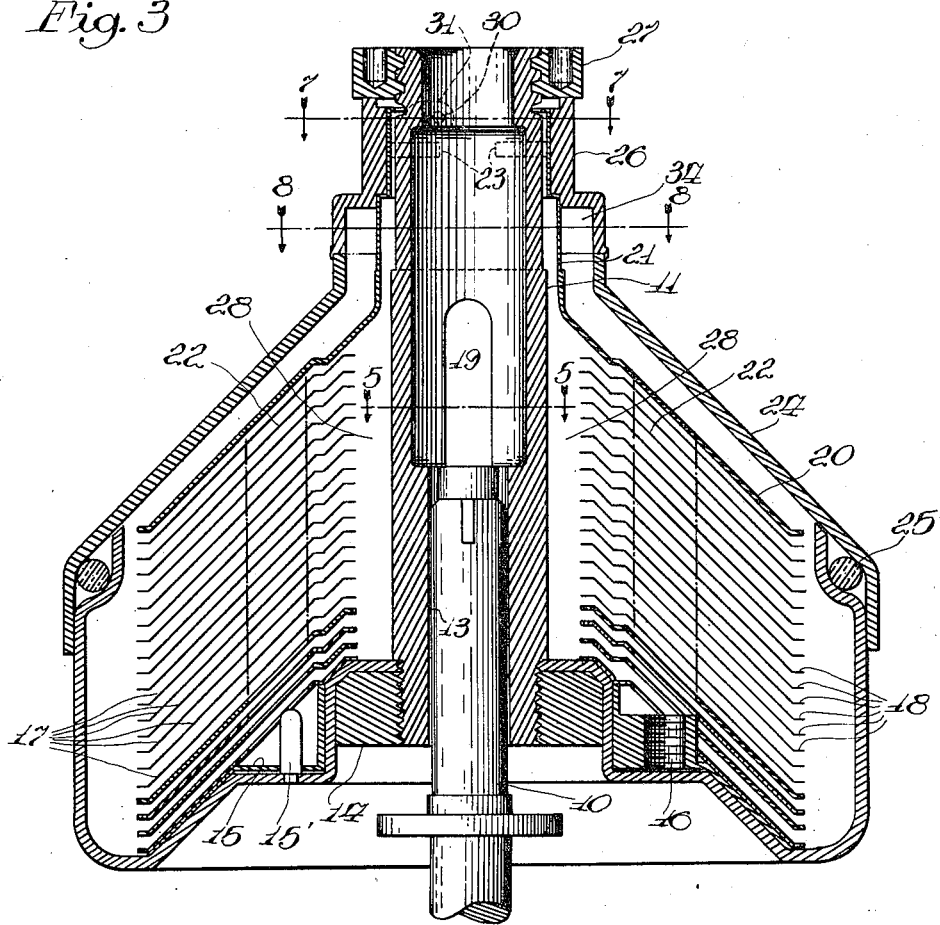
Figure 3 is a cross sectional view similar to the showing in Figure 1, but looking through the bowl along the section line 3—3 appearing in Figure 2.
Figure 4:
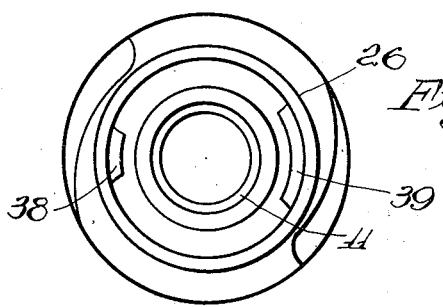
Figure 4 is a top plan view of the neck of the bowl per se.

The bottom of the bowl 12 carries a lower disk 15 formed with a threaded socket 16, as shown in Figure 3, said disk being open through its center, vertically, so that it slides down over the shaft 11 in a manner well known. This bottom disk has a lower conical portion terminating in a flangeless lower edge. Superimposed on this bottom disk 15 is a stack of conical shaped, separator disks 17, spaced slightly apart as in standard practice, and also slid down over the shaft 11, each of said disks terminating in the usual horizontal flange 18 at its lower edge. Thus, as the bottom disk 15 has a flangeless lower edge, the bottommost disk 17 of the main stack of disks fits down closely over the bottom disk 15, with the flange 18 of said bottommost disk 17 being raised but slightly above the floor of the bowl 12. Therefore, by eliminating the flange from the bottom disk 15, it is possible to employ an extra disk for a given height of the disk stack, or, looking at the matter in another light, it is possible to lower the height of the bowl if only the same number of disks is to be employed. In either case, advantages accrue, for, in a lower bowl, better balance can be had, and, if an extra disk is used, then more efficient separation results. Said lower disk 15 is properly positioned in the bowl by means of a locater pin 15' that is passed through an appropriate hole in the disk, as is clear from an inspection of Figure 3.

The shaft 11 is tubular and is formed with two downwardly inclined whole milk inlets 19 arranged in diagonally opposed relation to each other. The top-most disk 20 of the stack of disks is a divider disk and is formed with a neck 21 that fits down over the shaft 11 and finds a rest on the inlets 19, as shown in Figure 1. As shown in Figure 3, two diagonally opposed sets of vertically registering holes 22 are formed through the disks 17, one set of said registering holes being adapted to register with the threaded socket 16 in the bottom disk 15, so that a rod, not shown, having a threaded lower end, may be passed down through said aligned openings 22 to be threadedly secured in the socket 16 to enable the entire stack of disks to be removed from the bowl 12 for washing and cleansing. In doing this, the divider disk 20 is first removed. The opposite set of holes 22 is provided merely to maintain a proper balance of the bowl during operation, as will be readily understood.

As shown in Figure 6, the upper end of the tubular shaft is formed with a cut out collar providing a plurality of irregularly spaced projections 23, the neck 21 of the divider disk, as shown in Figure 7, being irregularly formed to fit down over the tubular shaft 11 in one certain location only. By this is meant that the divider disk 20, to fit over the shaft 11, can only be located with respect thereto in one way, which, of course, will be the desired way. In other words, this assembly is fool proof, as it must of necessity be made correctly.

In closing the top of the bowl 12, an upper bowl shell 24 is fitted down over the upper peripheral edge of the bowl, a rubber, or other gasket ring 25 being provided, as shown, to seal the joint. The top edge of the bowl shell 24 has joined thereto, a neck collar 26 surrounding the upper end of the shaft 11 and held thereon by a nut 27 which is threaded down on the upper end of the shaft 11 in the manner clearly shown in Figure 3.

The bowl is formed with opposed cream passages 28 which lead upwardly between the neck 21 of the dividing disk 20 and the collar 26, as shown best in Figure 3, the cream passage space at the neck being around the entire periphery of the tubular shaft 11, as shown in Figure 7, so that the cream may rise wherever possible in the spaces between the outer periphery of the tubular shaft 11 and the inner periphery of the neck 21. At opposed points above the projections 23 on the shaft 11, the neck 21 is formed with indented portions 29 (see Figure 7) to provide tangentially disposed, opposed cream outlets 30 leading to discharge passages or openings 31 formed in the collar 26 adjacent each outlet opening 30. A cream receiving cover and discharge spout to receive the cream from the outlets 30 has not been shown, but it is to be understood such parts will be carried around the bowl neck in the conventional manner.

Thus, it will be seen that two outlets are provided for the cream which outlets are oppositely located, in balance, and arranged tangent to the rotation of the bowl, thereby decreasing power consumption. The desired result is an even cream flow, even if the bowl should vary considerably in speed. It also serves to get rid of a one sided reaction pressure occurring when the usual single cream outlet is used, with the resultant gyral movement causing tipping of the bowl in operation. Further, the same number of whole milk inlet places 19 as cream outlets 30 and skim milk outlets 36 serves to make an even flow of the fluids through the disks of the bowl, thus increasing the effectiveness of the separating action of said disks.

The skim milk being of the greatest density, or weight, is moved to the outer edges of the disks 18, the same flowing off the flanges 18 and upwardly through a milk passage space 32 between the outer edges of the disks and the inside of the bowl 12, as appears in Figure 1. This skim milk passage 32 continues upwardly at 33 between the division disk 20 and bowl upper shell 24 and thence to the annular space 34 formed by enlargement of the lower portion of the collar 26. (See also Figure 8.) Thus, the skim milk passes to the neck of the bowl on the outside of the neck 21 of the division disk 20. At diametrically opposed points, the collar 26, as shown in Figure 8, is inset, as at 35, to permit location of diametrically opposite, skim milk outlets 36 arranged tangentially to the direction of rotation of the bowl, one of said outlets 36 being somewhat larger than the other, but adjustable in size by means of a regulating screw 37. Thus, there are also two skim milk outlets arranged in balance to further easy, smooth running of the bowl. A skim milk cover and discharge spout to receive the skim milk from the outlets 36 has not been shown, but it is to be understood that such parts will be carried around the bowl neck in the well established manner.

In operation, the whole milk enters the upper end of the tubular bowl shaft 11, the same flowing in a divided stream through the inlets 19 into the stack of disks 17 which aid the centrifugal action set up by high speed rotation of the bowl 12 with the spindle 10 to separate the cream from the skim milk, the cream passing up the inner passage 28 and out the holes 30, while the skim milk goes up the outer passage 32, 33 and is discharged through the holes 36.

The bowl parts, especially the whole milk inlets, the cream outlets, and the skim milk outlets are arranged in opposed pairs to provide perfect balance; further, the tangential disposition of the cream and skim milk outlets set up balanced forces to keep the bowl running smoothly.

The provision of the collar cut outs 23 on the tubular shaft 11 serves properly to locate the dividing disk 20 and arranges the cream passages properly with respect to the cream outlets.

Further, the neck 26 of the upper bowl shell 24 is provided with two lugs 38 and 39 (see Figure 7) of different sizes, so that said neck 26 can fit only in one way over the inner neck 21 and especially with the conformation thereof as determined by the irregular spacing of the projections 23. While these lugs 38, 39 are of different size, they nevertheless are of the same weight because the larger and heavier lug 39 is cut away, as at 40, for this purpose.

The flangeless lower disc 15 permits use of more disks for a given height, or enables lowering of the bowl height.

From this disclosure it will now be apparent that an improved cream separator bowl has been provided, which achieves all of the objects heretofore recited.

It is the intention to cover all such changes and modifications of the example herein shown which do not depart from the spirit and scope of the invention as indicated by the following claims.

What is claimed is:

1. A cream separator comprising a bowl having a tubular shaft extending above the bowl, a stack of disks carried in the bowl around the lower end of said shaft, a division disk at the top of said stack of disks and having a neck surrounding the upper end of the shaft to provide a cream passage, a cover shell for the bowl to provide a skim milk passage, said shell having a neck surrounding the neck of the division disk, said shaft provided with whole-milk inlets leading to the stack of disks, said neck of the division disk formed with cream outlets disposed tangent to the direction of rotation, said neck of the cover shell formed with skim milk outlets also disposed tengentially, said whole-milk inlets in the shaft being two in number and located in diametrically opposed relationship, said cream outlets and skim milk outlets also being arranged in pairs respectively and in diametrically opposed relationship, and means for interlocking the tubular shaft, division disk neck and shell neck to locate said parts in one way only for assembly.

2. A cream separator comprising a bowl having a tubular shaft extending above the bowl, a stack of disks carried in the bowl around the lower end of said shaft, a division disk at the top of said stack of disks and having a neck surrounding the upper end of the shaft to provide a cream passage, a cover shell for the bowl to provide a skim milk passage, said shell having a neck surrounding the neck of the division disk, said shaft provided with whole-milk inlets leading to the stack of disks, said neck of the division disk formed with cream outlets disposed tangent to the direction of rotation, said neck of the cover shell formed with skim milk outlets also disposed tangentially, said whole-milk inlets in the shaft being two in number and located in diametrically opposed relationship, said cream outlets and skim milk outlets also being arranged in pairs respectively and in diametrically opposed relationship, a collar formed at the upper end of the shaft and having irregularly spaced cut-outs, said collar being located on the shaft at a point vertically between the cream and skim milk outlets, and the neck portions of the division disk and bowl shell having complementary irregularities in shape to locate said parts relative to the shaft thereby properly positioning the outlets with respect to the passages.

FELIX C. SANDSTROM.